455-612 AU 233 EX
FIP8106 XR 3,984,824

United States Patent [19] [11] 3,984,824
Blackburn [45] Oct. 5, 1976

[54] WIDE-BAND OPTICAL ANALOG SIGNAL LINK USING FIBER OPTICS

[75] Inventor: James C. Blackburn, Adelphi, Md.

[73] Assignee: The United States of America as represented by the Secretary of the Army, Washington, D.C.

[22] Filed: July 25, 1975

[21] Appl. No.: 599,213

[52] U.S. Cl. .......... 340/189 R; 250/199; 307/264; 307/311; 325/46

[51] Int. Cl.[2] .......... G08C 19/36

[58] Field of Search .......... 340/189 R, 228 S, 333; 250/199; 325/46, 147; 307/286, 287, 222 B, 225 B, 264, 311

[56] References Cited

UNITED STATES PATENTS

| | | | |
|---|---|---|---|
| 3,290,433 | 12/1966 | De France et al. | 325/46 |
| 3,517,314 | 6/1970 | Miyagi | 325/46 |
| 3,590,250 | 6/1971 | Witkover | 250/199 |
| 3,700,917 | 10/1972 | Suzuki | 307/286 |
| 3,721,837 | 3/1973 | Trapani et al. | 307/286 |
| 3,814,929 | 6/1974 | Whitfield | 250/199 |
| 3,913,098 | 10/1975 | Nakamura | 340/244 C |

*Primary Examiner*—John W. Caldwell
*Assistant Examiner*—James J. Groody
*Attorney, Agent, or Firm*—Nathan Edelberg; Robert P. Gibson; Saul Elbaum

[57] ABSTRACT

An analog signal is provided to a transistor circuit which shapes the signal to enhance the high frequency components thereof. An LED receives the enhanced signal so that a normally degraded light signal from an LED is compensated for thereby generating light signals that correspond with the original analog input. Fiber optics connect the LED to a receiver circuit, that detects the light communicated across fiber optics, and reconverts them to an electrical signal corresponding to the original analog input signal at the transmitter.

10 Claims, 2 Drawing Figures

WIDE-BAND OPTICAL ANALOG SIGNAL LINK USING FIBER OPTICS

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to communication systems, and more particularly to a wide band signal link utilizing fiber optics.

BRIEF DESCRIPTION OF THE PRIOR ART

Transmitting signals via fiber-optic cables is very attractive in many instrumentation situations because of the nonconducting nature of the cable. The lack of electrical conductivity eliminates ground loops, and also avoids noise pickup induced by electric or magnetic fields in the vicinity of the signal transmission path. It also permits the signal source to be floated at any potential, either DC or AC, with respect to the signal receiver.

Fiber-optic transmission is particularly useful in experiments to determine the response of systems to transient electromagnetic pulses where it is necessary to employ measurement techniques which disturb the normal environment of the equipment under test as little as possible. A serious source of disturbance in many situations in the presence of signal-carrying cables extending from the point of test to a more-or-less remotely located test instrument. These cables may affect observations of the normal responses of the system under test in several ways: the cables may pick up spurious signals themselves, thus producing a degraded signal to noise ratio in the measurement; they may form a shield which alters the fields around the point of measurement, thus changing the intended test conditions; or they may form an unintended channel by which external signals are transmitted into an otherwise shielded enclosure, thus upsetting the functions within the enclosure.

Transmission of digital signals via optoelectronic methods has been developed considerably. GaAs light emitting and laser diodes are well suited to pulse modulation and have been modulated at data rates well exceeding 100 megabits/second. Transmission rates in the area of a gigabit/second have been obtained in integrated optic systems using electro-or acousto-optic modulators in conjunction with CW lasers. This capability for digital signals is of little use for real-time transmission of high-frequency single events since it is not possible to digitize them with sufficient speed except with bulky equipment. Existing linear response signal transmission systems using LED's and fiber optics have been limited to an upper frequency response of about 50 MHz.

BRIEF DESCRIPTION OF THE PRESENT INVENTION

Utilizing the present invention, a wide band linear signal transmission link employing fiber optic cable as the transmission medium has been built and used successfully in the field for transient electromagnetic pulse testing. The flexibility of the small diameter (2 mm) fiber cable, combined with the small size (180 cm$^3$) of the transmitter, allows the transmitter to be placed very close to the sensor or probe so that signal transmission is almost entirely along the dielectric with negligible lengths of conducting cable.

By utilizing a multiplicity of peaking circuits, high frequency components of a signal are emphasized thereby compensating for the degradation of light output, through a signal transducer, in the form of a LED. The present invention utilizes a LED in a transmitter which is operated, in a completely linear region. This is in marked contrast to the prior art utilization of LED's in digital signal links, where brute force overdriving of a LED occurs for a first binary condition while virtually no driving of a LED occurs during an opposite binary condition. Thus, the present invention is directed to an electro-optic signal link, utilizing a LED in the transmitter thereof, which continually operates in a linear mode.

DETAILED DESCRIPTION OF THE INVENTION

Figure 1:
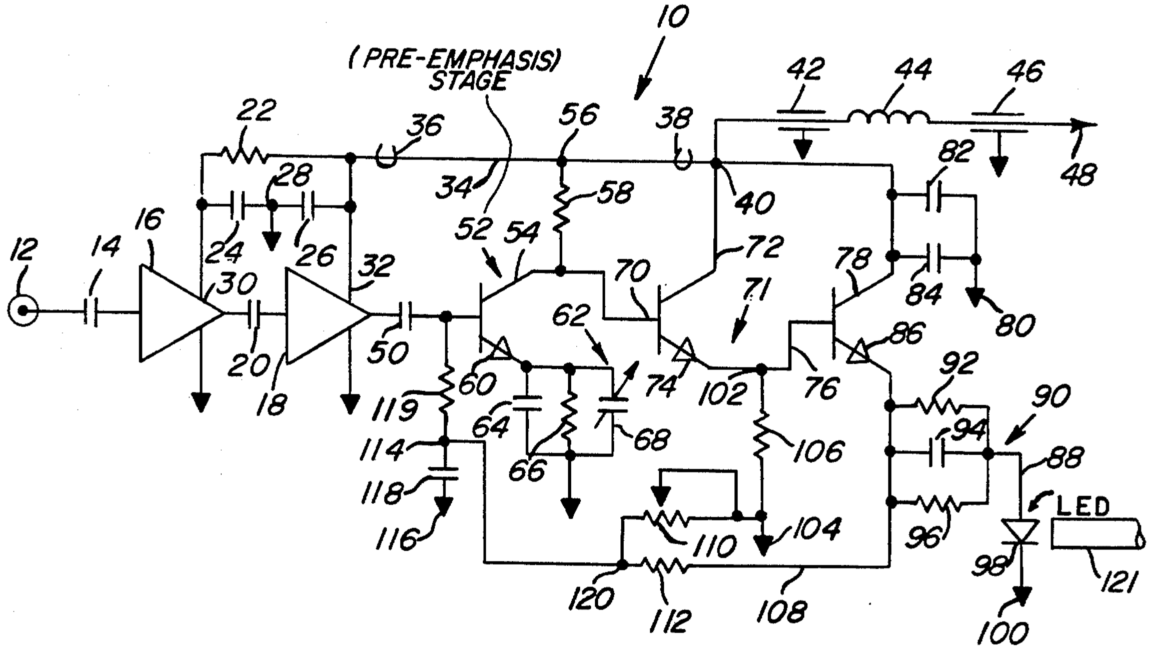
FIG. 1 is an electrical schematic diagram of a signal link transmitter as employed in the present invention.

FIG. 1 is a schematic diagram of the transmitter 10, as utilized in the present invention.

An analog signal, typically a 50 ohm input appears at 12 and provides an input to a first linear amplifier 16, through a DC blocking capacitor 14. The output from the amplifier 16 feeds a second stage of amplification 18, through a DC blocking capacitor 20. The amplifiers are of the type commercially available from Avantek Corporation, and are indicated by chip numbers GPD 461 and 463, respectively. The amplifier chip 16 is connected at line 30 to a power potential through a decoupling resistor 22, which is serially connected with ferrite beads 36 and 38, which dampen high frequency oscillations, such as due to noise. The previously mentioned ferrite beads 36 and 38 are commercially available ferrite cores, available from manufacturers such as FERROX Cube Corp. The resistor 22 is paralleled by capacitors 24 and 26 that have an intermediate junction 28 grounded. The beads 36 and 38 are connected to a potential junction 40, along lead 34, which is in turn connected with additional high frequency dampening components including serially connected feedthrough capacitors 42 and 46, serially connected with an inductance 44. These components are then connected to a DC potential at 48, for providing power to the amplifier chips 16 and 18 (lead 32).

The output from amplifier 18 is fed, via a DC blocking capacitor 50 to the base of a pre-emphasis driver transistor stage 52. The collector 54 of the transistor 52 is connected to a potential junction 56, through a collector load resistor 58. The emitter 60 is connected to a parallel RC peaking network 62, including a fixed capacitor 64, an adjustable capacitor 68, and a parallel connected resistor 66, all of which are connected at a first end thereof to the emitter 60 and an opposite end thereof to ground. The purpose of the peaking network 62 is to serve as a DC return to the transistor 52 and to also emphasize high frequency components of the signal passing through the transistor's driver stage 52. The output from the transistor stage 52 is fed to the base 70 of an emitter-follower stage 71 including a first transistor associated with the base 70. The collector 72 of the transistor is connected to a potential point 40, whereat power is provided. The junction point 40 is returned to ground 80, through parallel connected capacitors 82 and 84 which provide a low inductance ground return for high frequency signals. The emitter 74 of the first transistor of the emitter-follower stage 71 is connected to the base 76 of a second transistor of the stage. The second transistor has its collector 78 connected to the junction point 40, as did the preceding transistor. The emitter 86 of the second transistor in the stage is connected to the anode 88 of an LED 98 through a second peaking network, generally indicated by reference numeral 90. The LED 98 may be of the type manufactured by RCA and identified as C30199. This second peaking network includes parallel connected resistors 92 and 96, along with a capacitor 94. Again, the purpose of the peaking network 90 is to emphasize high frequency signals passing through the emitter-follower stage 71. The cathode of the LED 98 is connected to ground at 100.

A junction point 102, between emitter 74 and base 76, of the emitter-follower transistors, is connected to ground 104 through a resistor 106. The ground return at 104 is connected to a first end of rheostat 110. The opposite end of the rheostat is connected to junction point 120 which is returned to the left end terminals of the peaking network 90, through a load resistor 112 and connecting lead 108. The junction point 120 is also returned to a junction point 114 that is defined between serially connected resistor 119 and capacitor 118. The lower end of the capacitor 118 is returned to ground, at 116. The purpose of the feedback path between emitter 86 and the junction point 114 is to provide quiescent stabilization for the LED 98, at an operating point which will render the LED 98 completely linear during its operation.

As opposed to the conventional utilization of LED's in digital circuits, wherein such a device is driven by brute force, between no power and maximum power, the present utilization of the LED 98 requires that it be driven in a completely linear manner inasmuch as the present invention involves the communication of analog signals.

If desired, a calibration circuit (not shown) can be connected to the emitter 60 of the transistor stage 52. The purpose of such a calibration circuit (not shown) would be to provide a standard known pulse to the circuit so that the output signal at LED 98 can be checked to verify proper circuit operation. Also, a calibration circuit may be provided for sensing low battery power for the power supply. In one working embodiment, such a calibration circuit, when detecting low battery power, increases its calibration pulse frequency so that during calibration, an operator detects an appropriate oscilloscope display at the receiver, to be discussed hereinafter.

Figure 2:
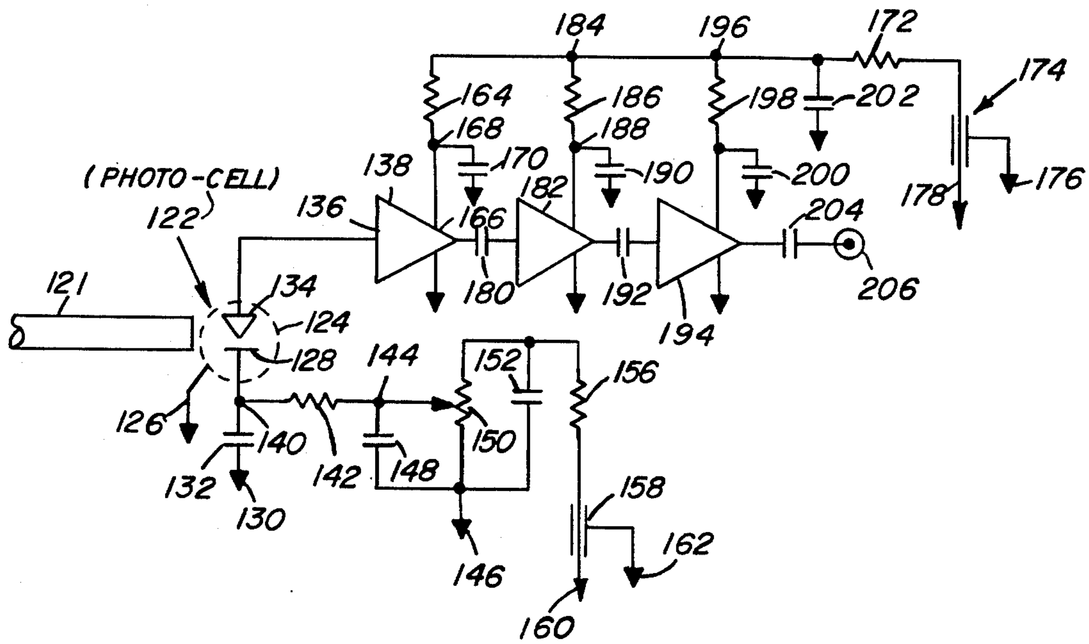
FIG. 2 is an electrical schematic diagram of a receiver as utilized in the present invention.

Referring to FIG. 2, the receiver portion of the present system is illustrated. The fiber optic 121 is shown, in FIG. 1, to be located adjacent the LED 98, to communicate light signals from the LED 98 to the receiver shown in FIG. 2. Therefore, a receiver end of the fiber optic 121 is located adjacent a photo cell 122 which converts the light signals back to electrical signals. The previously mentioned photo-detector 122 may be of the type manufactured by RCA and identified as C30817. The photo cell is generally indicated by reference numeral 122 and may be of the type known as a silicon avalanche-type photo-detector. The case 124 of the photo-detector or cell is grounded at 126. The cathode 128 is grounded at 130, through a DC blocking capacitor 132. The anode 134 of the photo-detector 122 is connected to the input 136 of a linear amplifier 138, that is identical to the amplifier 16, discussed in connection with FIG. 1.

A reverse DC bias is provided to the photo-detector 122 at a junction point 140, at the cathode 128 of the device. A current limiting and decoupling resistor 142 is connected at its left end to the junction 140 while the opposite end of the resistor 142 is connected to a wiper 144 of a potentiometer 150. A first terminal of the potentiometer 150 is grounded at 146. A capacitor 148 is connected between wiper 144 and ground 146. A capacitor 152 parallels the resistor of potentiometer 150. A second terminal of the potentiometer 150 is connected to a high DC potential 160, through series connected current limiting resistor 156 and feed through type capacitor 158 that is also grounded at 162. This type of feed through capacitor is of conventional design and is available from manufacturers, such as the Erie Corporation.

In marked contrast to the usual inclusion of a DC blocking capacitor between the photo-detector anode 134 and the input terminal 136 of amplifier 138, the present invention includes a direct connection. The result is a decrease in stray inductance as well as an increase in high frequency response.

The amplifier 138 is connected to a DC potential, at its terminal 166, through a decoupling resistor 164. The junction 168 between the resistor 164 and terminal 166 is grounded, through a high frequency bypass capacitor 170. A serially connected decoupling resistor 172 is connected with the resistor 164, which is in turn serially connected with a feed through capacitor, generally indicated by reference numeral 174, the latter being grounded at 176 and passing through a DC potential at 178.

The output from amplifier stage 138 is fed, via a DC blocking capacitor 180, to a second stage of amplification at 182. The amplifier 182 is of identical design to the amplifier 138. Likewise, DC power decoupling via junction 184 is employed by utilizing resistors 186 and capacitor 190, respectively identical to the previously mentioned resistor 164 and capacitor 170, having junction 188 connected therebetween. The output from the second stage amplifier 182 is connected, via a DC blocking capacitor 192, to a third stage of amplification at 194. The amplifier 194 is identified in the trade, as GPD 462, also available from Avantek Corporation. The decoupling resistor 198, is connected to an upper junction 196 and at a lower terminal to high frequency bypass capacitor 200, both components serving the same function as the previously mentioned resistor and capacitor 186 and 1902. Further decoupling between the DC potential and ground is provided by an additional capacitor 202 which is connected to the left terminal of the coupling resistor 172. The opposite terminal of the resistor is connected to the feed through capacitor 174, as previously mentioned.

The output from the last stage of amplification 194 is connected through a DC blocking capacitor 204 to an output terminal 206. The final electrical signal is made available at this terminal and typically represents a 50 ohm signal which can be directly coupled to an oscilloscope for visual determination of signal communication.

I wish it to be understood that I do not desire to be limited to the exact details of construction shown and described, for obvious modifications can be made by a person skilled in the art.

What is claimed is:

1. In an analog signal lines system, a transmitter comprising:

an input terminal for accepting an analog signal thereat;

pre-emphasis means connected in circuit with the input terminal for emphasizing the high frequency components of the signal;

emitter-follower means connected to the output of the pre-emphasis means for further emphasizing the high frequency components of the signal;

at least one LED driven by the output of the emitter-follower means for generating a light output in response to the high frequency emphasized input signal, the light output corresponding linearly to the input analog signal; and stabilization means connected to the LED for ensuring linear performance of the LED over its entire operating range.

2. The subject matter set forth in claim 1 together with fiber optic means, a light output end thereof disposed adjacent the LED for communicating the light output to an opposite end of the fiber optic.

3. The subject matter of claim 2 wherein the pre-emphasis means includes a transistor having a first terminal connected in circuit with the input signal, a second terminal connected to the emitter-follower means, and a third terminal connected to a parallel RC combination of components, and together with means for amplifying the input signal connected between the input terminal and the pre-emphasis means, and further wherein the emitter-follower means has a parallel RC combination of components connected between the output of the emitter-follower means and an anode terminal of the LED.

4. The subject matter set forth in claim 3 together with a receiver disposed at an opposite end of the fiber optic means for receiving the light output from the transmitter, the receiver comprising:

photo-detector means for converting the light output to a corresponding electrical receiver signal;

means connected to the output of the photo-detector means for amplifying the receiver signal; and terminal means connected to the output of the amplifying means for producing thereat, a utilizeable signal corresponding to the input analog signal at the transmitter.

5. The subject matter set forth in claim 4 wherein the photo-detector means is a silicon avalanche type photodetector.

6. The subject matter of claim 2 together with a receiver disposed at an opposite end of the fiber optic means for receiving the light output from the transmitter, the receiver comprising:

photo-detector means for converting the light output to a corresponding electrical receiver signal;

means connected to the output of the photo-detector means for amplifying the receiver signal; and terminal means connected to the output of the amplifying means for producing thereat, a utilizeable signal corresponding to the input analog signal at the transmitter.

7. The subject matter set forth in claim 6 wherein the amplifying means comprises at least one stage of amplification, and further wherein the output of the photodetector means is directly connected to an input of the amplifying means for optimizing the high frequency response of the receiver.

8. The subject matter of claim 1 wherein the pre-emphasis means includes a transistor having a first terminal connected in circuit with the input signal, a second terminal connected to the emitter-follower means, and a third terminal connected to a parallel RC combination of components.

9. The subject matter of claim 1 together with means for amplifying the input signal connected between the input terminal and the pre-emphasis means.

10. The subject matter of claim 1 wherein the emitter-follower means has a parallel RC combination of components connected between the output of the emitter-follower means and an anode terminal of the LED.

* * * * *